Aug. 26, 1924.  
H. G. COX  
1,506,569  
MAGNETO ELECTRIC GENERATOR  
Filed Sept. 9, 1921   6 Sheets-Sheet 1
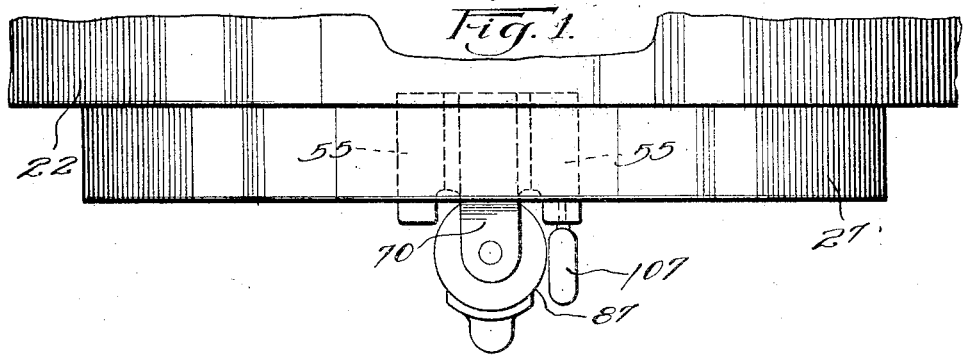
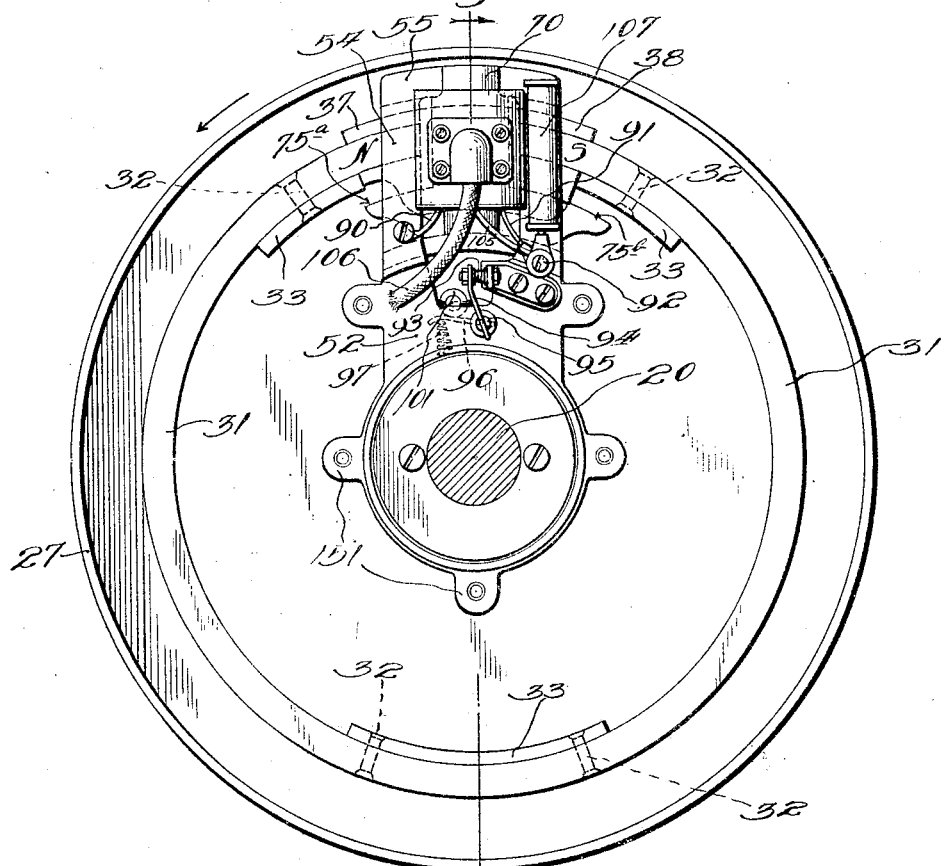
Inventor:  
Henry G. Cox.

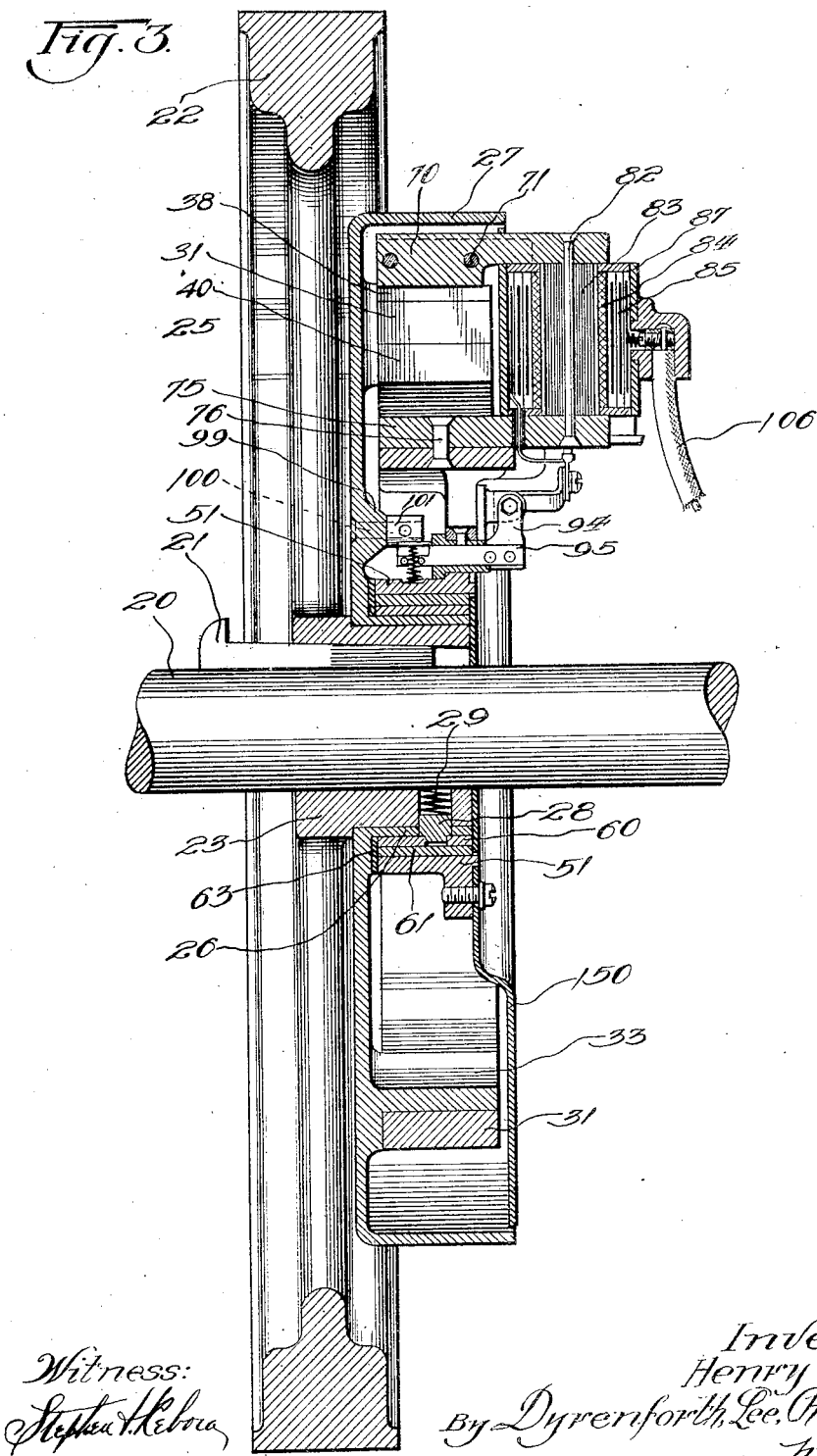

Aug. 26, 1924.  1,506,569
H. G. COX
MAGNETO ELECTRIC GENERATOR
Filed Sept. 9, 1921    6 Sheets-Sheet 3
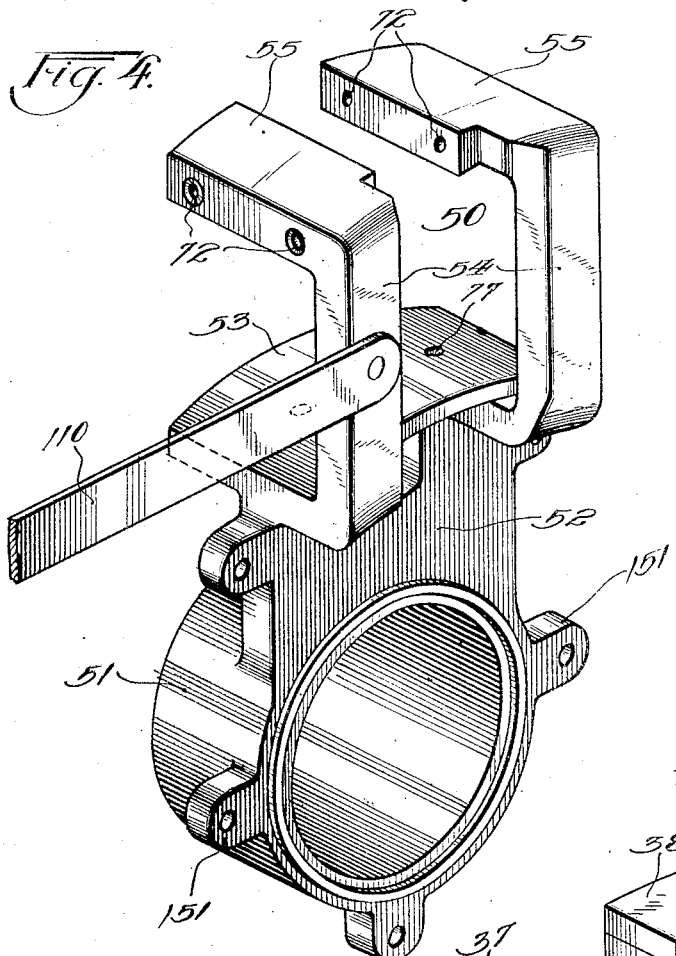
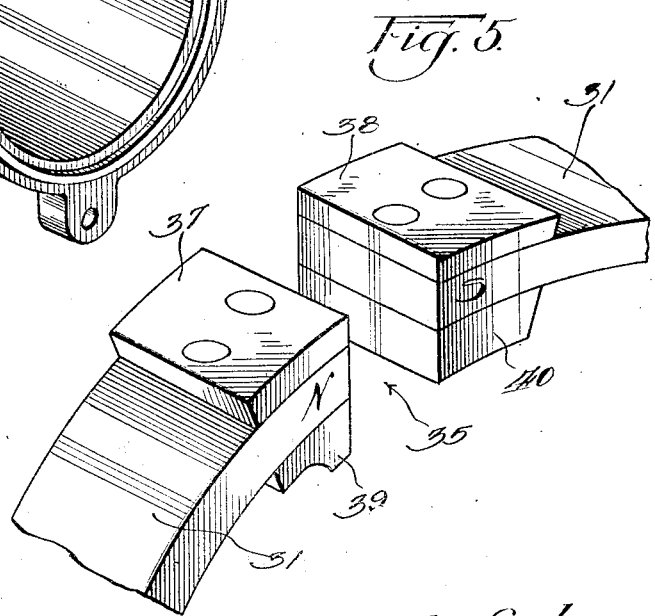
Inventor:
Henry G. Cox.
By Dyrenforth, Lee, Chritton & Wiles
his Attys.

Aug. 26, 1924.
H. G. COX
1,506,569
MAGNETO ELECTRIC GENERATOR
Filed Sept. 9, 1921
6 Sheets-Sheet 4
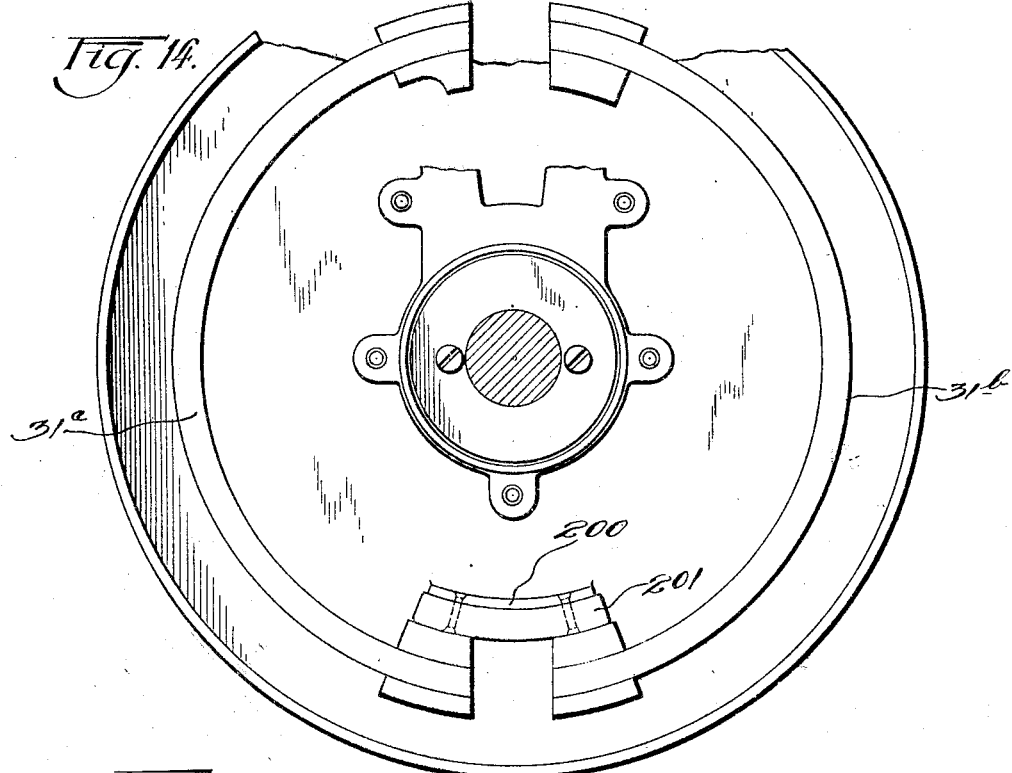
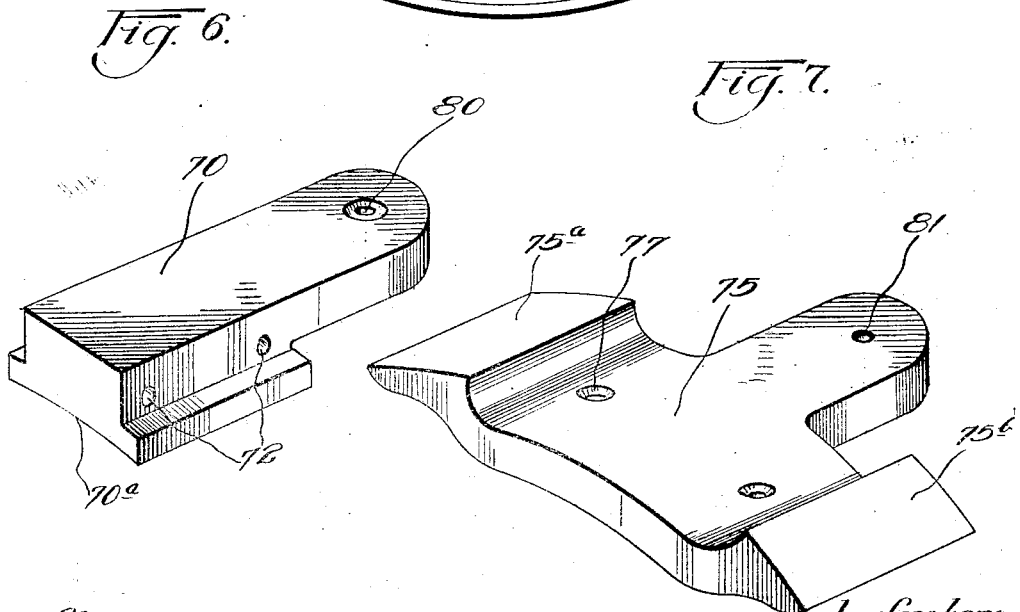
Witness:
Inventor:
Henry G. Cox.

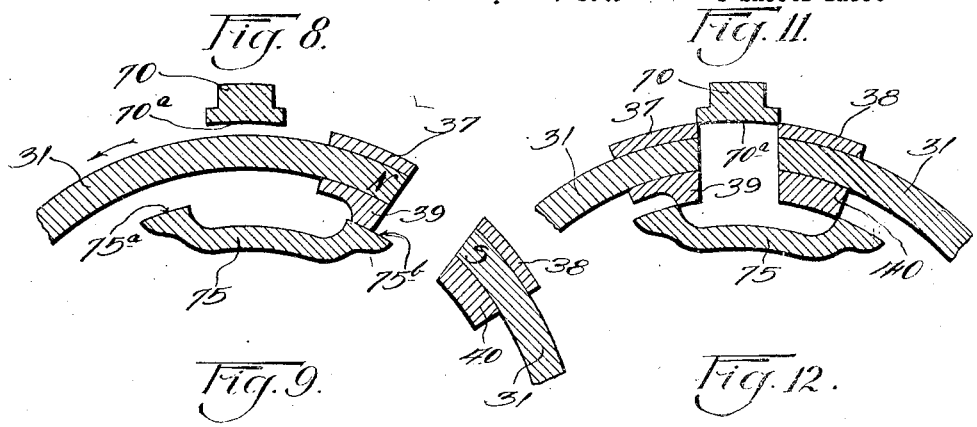
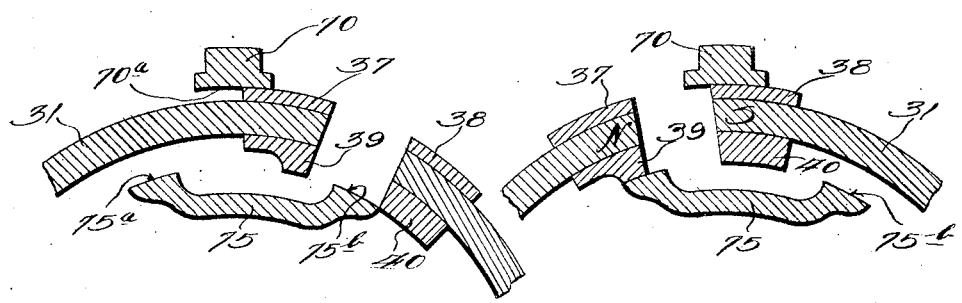
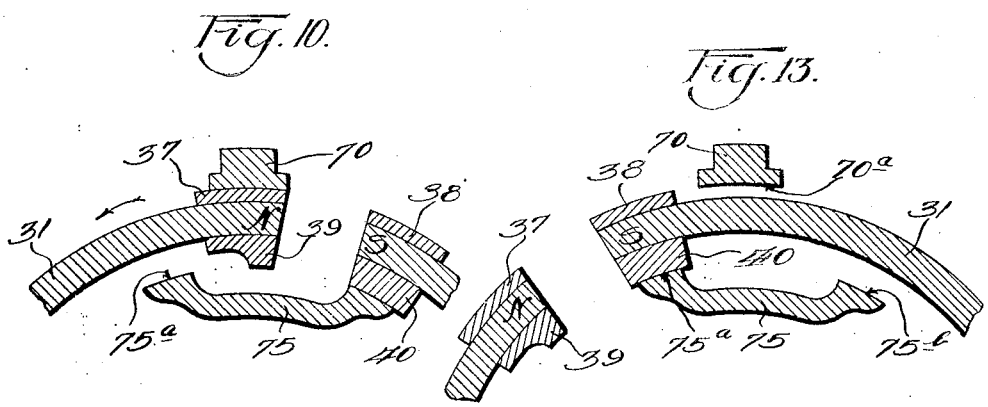

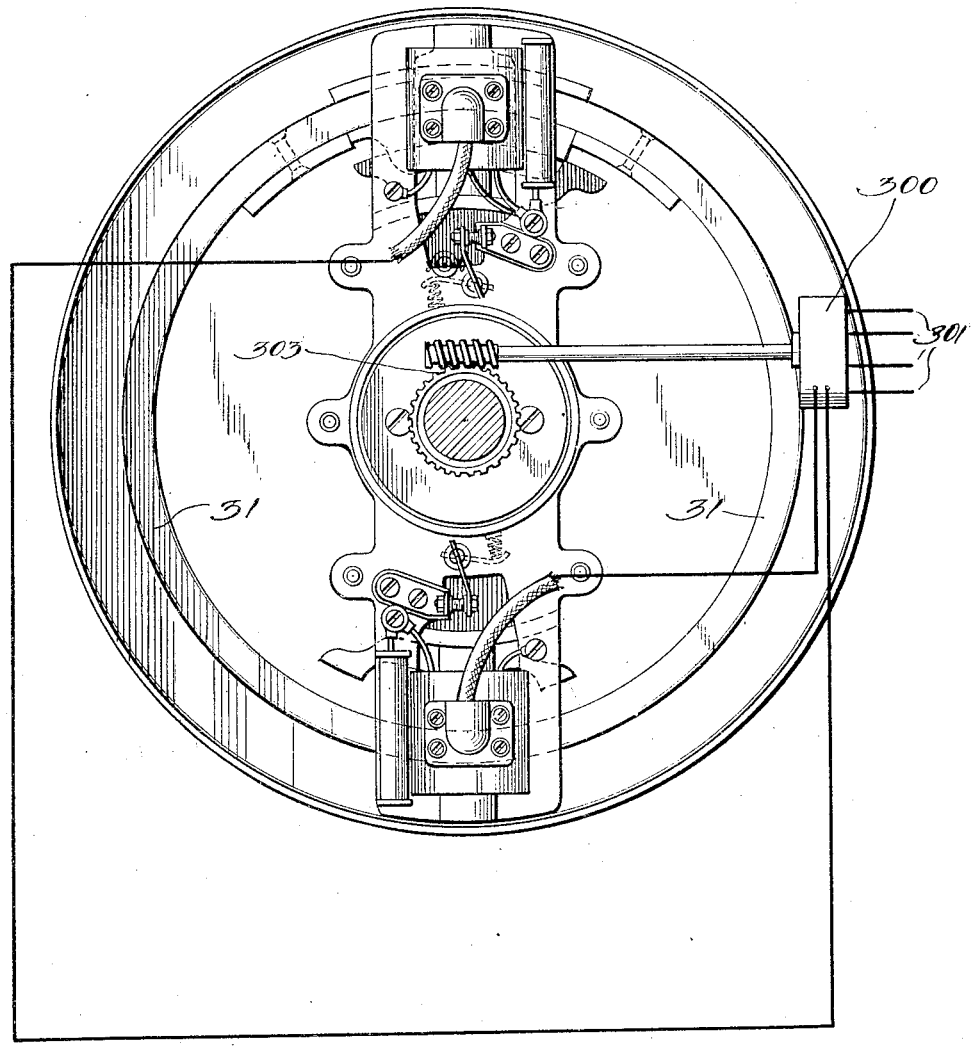

Patented Aug. 26, 1924.

1,506,569

UNITED STATES PATENT OFFICE.

HENRY G. COX, OF CHICAGO, ILLINOIS.

MAGNETO ELECTRIC GENERATOR.

Application filed September 9, 1921. Serial No. 499,465.

*To all whom it may concern:*

Be it known that I, HENRY G. COX, a citizen of the United States, residing at 6729 Clyde Avenue, Chicago, in the county of Cook and State of Illinois, have invented a new and useful Improvement in Magneto Electric Generators, of which the following is a specification.

This invention relates to improvements in magneto electric generators and is here shown as embodied in a device especially adapted for use in connection with internal combustion engine ignition. My improved generator is very neat and compact and very efficient. It is also so constructed that it can easily be designed for installation inside the fly wheel of an internal combustion engine. Other features and advantages of the device will appear more fully as I proceed with my specification.

The invention will be fully understood from the following specification and the accompanying drawings, in which:

Fig. 1 is a top plan view of a device embodying the features of my invention, Fig. 2 is a view of the same in side elevation, Fig. 3 is a view taken as indicated at line 3 of Fig. 2, Fig. 4 is a view in perspective of a part of the device, Fig. 5 is a view in perspective of the ends of the permanent field magnet showing the pole pieces attached thereto, Figs. 6 and 7 are views in perspective of the armature pole shoes, Figs. 8 to 13 are views showing successive positions of certain parts during the operation of the device, Fig. 14 is a view similar to Fig. 2 showing a modified form of the device and Fig. 15 is a view similar to Fig. 2 showing another modified form.

I have here shown a generator, embodying the features of my invention, adapted for use in connection with an internal combustion engine and driven thereby, to deliver a high tension current for use in ignition. It is obvious however that, without detracting from the spirit of my invention, such a generator could be driven by other means than an internal combustion engine and could be adapted to deliver either a high tension or low tension current as desired for use in engine ignition or for any other desired purpose.

As shown in the drawings, 20 indicates the shaft of an internal combustion engine having mounted thereon in any suitable manner as by means of the key 21, a fly-wheel 22. The hub of the fly-wheel is indicated by 23.

Mounted on the hub 23 is a field magnet carrying case comprising primarily a circular plate 25 having a central hole adapted to fit over the hub 23. The central hole is provided with a circular flange 26 forming a sleeve fitting snugly over the hub 23. The outer edge of the plate 25 is surrounded by a flange or rim 27 as shown. Rotation of the magnet carrying case on the hub 23 is prevented by means of the pin 28 which locks the hub 23 and sleeve 26 together. The pin 28 is held in position shown by means of a small spiral spring 29. The magnet carrying case is preferably made of aluminum, although, if desired it may be made of any other suitable material. Concentrically mounted within the magnet carrying case is a circular permanent field magnet 31 which is held in place by means of suitable rivets 32 holding it to the bosses 33 projecting from the plate 25 as shown. I have arbitrarily indicated the two ends of the permanent field magnet by N and S (see Fig. 5) and it will be noted that there is an air gap between the two poles as indicated by 35. Each of the poles of the permanent field magnet is provided with two pole pieces of suitable metal to assist in concentrating the magnetic flux at such points. The pole pieces on the outer sides of the poles N and S are indicated by 37 and 38 respectively, and those on the inside by 39 and 40 respectively.

I will now describe the armature. The various parts of the armature are mounted on a carrier which is formed as shown in perspective in Fig. 4. I have indicated this carrier in general by the reference numeral 50. It will be noted that it comprises a hub 51 carrying a flat upwardly projecting part 52 having mounted on its end a segment of a circular rim as indicated by 53. Projecting upwardly from one edge of the rim 53 at its ends are two arms 54 having their outer ends bent at right angles to lie above the rim 53 and parallel with the face thereof as indicated by 55. The sleeve 51 fits over the sleeve 26, and two bushings 60 and 61 of steel and brass respectively are interposed between the two in order to reduce frictional wear. A suitable thrust washer 63 is also provided at the inner end of the sleeve 51 and the inner ends of the bushings 60 and 61 in order to reduce wear at these points.

An upper armature core head 70 is mounted between the arms 55 by means of the rivets 71 which extend through suitable holes 72 in the parts, and a lower armature core head 75 is mounted on the segmental rim 53 by means of rivets 76 extending through suitable holes 77 in the parts. The armature core heads 70 and 75 are provided with extensions having holes 80 and 81 respectively, adapted to receive a bar 82 which carries an armature core 83 preferably made up of soft iron wires. The core 83 is surrounded by a primary winding 84 of relatively large wire, and this coil in turn is surrounded by a secondary winding or coil 85 of relatively fine wire. The coils 84 and 85 are enclosed by a casing 87 made of hard rubber or other suitable material. The lower armature core head 75 has its ends turned upwardly (see Fig. 7) to form the faces 75$^a$ and 75$^b$. When the parts are mounted in position, as shown in Figs. 2 and 3, the permanent field magnet 31 lies between the armature core heads 70 and 75, and these heads are close enough together so that the ends of the permanent field magnet with their pole pieces will barely pass between. As the ends of such magnet pass between, the pole pieces 37 and 38, which are curved on top, will pass very close to and adjacent the lower correspondingly curved face 70$^a$ of the core head 70, and the inner concavely curved surfaces of the pole pieces 39 and 40 will likewise pass very close to and adjacent the curved faces 75$^a$ and 75$^b$ of the armature head 75.

The connections on the coils 84 and 85 are made as follows. One end 90 of the primary coil 84 is grounded and the other end 91, is fastened to a connector 92 which is suitably insulated from the ground. From the connection 92, an insulated circuit leads to one of the contacts of a circuit breaker 93. The other contact of the circuit breaker 93 is mounted on the end of a short arm 94 which is fastened to a rocker shaft 95 at one end. This contact is grounded. The other end of the rocker shaft 95 is provided with a short arm 96. The two points of the circuit breaker are normally held closed at 93 by means of a small spiral spring 97 arranged under one end of the arm 96. The plate 25 is provided with a boss 99 carrying a pin 100 having mounted on its end a cylindrical part 101 adapted to strike the end of the arm 96, upon rotation of the plate 25, to rock the shaft 95 and cause a break in the circuit at 93, by separation of the contact points. When the circuit breaker 93 is open, the end 91 of the primary coil 84 is not grounded, and when the circuit breaker is closed, such end 91 is grounded, and the coil therefore short circuited. One end 105 of the secondary coil 85 is connected to the connector 92, and the other end 106 is led to the place at which the supply of current is desired, such as the spark plug of the engine. A suitable condenser 107 is provided having one side attached to the connector 92 and the other side grounded.

I will now describe the operation of the device. In Fig. 2 the arrow indicates the direction of rotation of the fly-wheel. The armature carrier 50 is held against rotation by means of a rod 110, one end of which is attached to one of the arms 54 and the other end is attached to any suitable fixed part. Means may also be provided, if desired, to shift the position of the carrier 50 in order to assist in timing. The magnet carrier and permanent magnet rotate with the fly-wheel of the engine, the magnet and its pole pieces passing between the armature heads 70 and 75 as described above. The movement and operation of the parts is best shown in Figs. 8 to 13, in which the direction of the rotation of the magnet 31 is indicated by the arrow, and successive positions are shown in the figures in sequence. As shown in Fig. 8, the pole piece 39 on the N pole of the magnet first comes opposite the face 75$^b$ of the head 75. When in this position, the armature core 83 will be placed in N magnetic state, but there will be practically no magnetic flow therethrough. Such magnetic state will assist in the magnetic flow to follow as hereinafter described. Upon further rotation of the magnet 31, the pole piece 37 will come opposite the face 70$^a$ of the head 70, and the pole piece 40 will meet the face 75$^b$, as shown in Fig. 9. Further rotation will bring the N pole piece 37 directly under the head 70 and the S pole piece 40 directly over the face 75$^b$ of the head 75 (see Fig. 10). When in this position there will be a strong magnetic flow through the core 83 from the head 70 to the head 75, assuming the magnetic flow to be from N to S. Further rotation will move the permanent magnet, so that the head 70 will bridge the pole pieces 37 and 38, the two faces 75$^a$ and 75$^b$ of the head 75 will span the pole pieces 39 and 40 (see Fig. 11). When in this position, all magnetic flow through the armature core will be momentarily cut off since none of the pole pieces of the permanent magnet are adjacent any of the faces of the armature core heads. Further rotation will bring the pole piece 38 opposite the head 70 and the pole piece 39 opposite the face 75$^a$ of the head 75. When in this position (see Fig. 12), it will be noted that magnetic flow is through the core 83 from the head 75 to the head 70 or in a reverse direction from that shown when the parts are in position shown in Fig. 10. Further rotation, as shown in Fig. 13, will bring the pole piece 40 opposite the face 75$^a$. The stopping and reversal of magnetic flow through the core 83 will cause a flow of current in the primary coil 84 if the same be short circuited. The stopping of such flow will induce a flow of current in the secondary coil in the usual manner. The greatest amount of current through the primary coil will be soon after the reversal of direction of magnetic flow through the core 83. The apparatus is timed so that the circuit breaker 93 will open when such flow of current through the primary coil is greatest or nearly so. Such opening of the contact 93, thus breaking the flow of current through the primary coil, will induce a current in the secondary coil 85, and the apparatus is so timed that this break, and delivery of current will be given as required by the spark plug. The exact timing will depend upon the firing requirements, magnetic and electrical lag, etc., and the exact desired position can be reached by slight rotation by the armature carrier 50 by means of the rod 110. The greatest flow of current through the primary coil will probably take place when the parts are about in position as shown in Fig. 12, when the magnetic flow has just been reversed through the armature core; and accordingly I have shown the circuit breaker 93 as opening at just about such point.

A suitable cover plate 150 is provided for the permanent magnet; and the same is adapted to be fastened to the carrier 50 by suitable screws in lugs 151 projecting radially from the hub part 51.

The preferred form as shown in Figs. 1 to 13 is adapted for use in connection with a one cylinder two cycle engine or a two cylinder four cycle engine, where a spark is required at each rotation of the fly-wheel.

In Fig. 14 I have shown a form of device adapted for use, for example, in connection with a four cylinder four cycle engine where two sparks are required for each rotation of the fly-wheel. The armature arrangement in this modified form is the same as in the preferred form. Instead of one permanent magnet, however, I provide two permanent magnets, each being somewhat less than semi-circular. I have indicated these magnets as 31ª and 31ᵇ respectively. In other words, it is as if the permanent magnet 31 shown in the preferred form had two air gaps diametrically disposed instead of one. In this modified form, the cover plate 150 on the magnet carrier is provided with an inwardly projecting piece 200, to which is attached a segmental piece of steel 201, adapted to magnetically connect the two poles of the magnets 31ª and 31ᵇ, which are not passing between the armature shoes. In the drawing, I have considered it unnecessary to show the armature; as it may be assumed that the same is in a vertical position as shown in Fig. 3. It will be noted that the operation of this modified form is substantially similar to the operation of the preferred form, except that two pairs of permanent magnet poles will pass between the armature core heads upon each rotation of the fly-wheel. When one pair is passing between the armature heads, the other pair will be magnetically bridged by the steel piece 201. By this construction there can be produced two sparks for each rotation of the fly-wheel.

In Fig. 15 I have shown another modified form adapted to be used, for example, in connection with a four cylinder four cycle engine in order to give two sparks for each rotation of the fly-wheel. In this modified form there is but one permanent magnet the same as in the preferred form; but there are two armatures, diametrically arranged as shown. For this construction, the poles of the permanent magnet will produce a spark when passing the heads of one armature, and produce another spark when passing the heads of the other armature. The two high tension terminals from the two armatures may be led to a suitable distributor 300 which may be of any desired form in order to direct the flow of current to the four wires 301, leading to the four cylinders of the engine. The distributor 300 may be operated in the well known manner by a two to one gear of any suitable form such as indicated by 303.

It is obvious that the modified forms shown in Figs. 14 and 15 could be combined. In other words a double permanent magnet could be used with two armatures, in order to give a double or reinforced spark. In such a combination, however, the steel piece 201 would be omitted, as each armature core would perform the same function for the other.

While I have shown and described certain embodiments of my invention, it is to be understood that they are capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new and desire to secure by Letters Patent is:

1. In a device of the character described, a field magnet, an armature coil, a core in the armature coil, one end of the armature core having a single-faced head and the other end having a double-faced head, said single-faced head lying opposite the double-faced head, and means for passing the poles of the field magnet between the heads of the armature core to bridge the poles of the field magnet through the armature core first in one direction and then in the reverse direction.

2. In a device of the character described, a field magnet, an armature coil, a core in the armature coil, one end of the armature core having a single-faced head and the other end having a double-faced head, said single-faced head lying opposite the double-faced head, and means acting through relative movement between the armature core and the field magnet, for bridging the poles of the field magnet through the armature core, first from one face of the double-faced head and then from the other.

3. In a device of the character described, a field magnet, an armature coil, a core in the armature coil, one end of the armature core having a single-faced head and the other end having a double-faced head, said single-faced head lying opposite the double-faced head, and means acting through relative movement between the armature core and the field magnet for bringing the two poles of the field magnet successively adjacent the single-faced armature core head, whereby the other pole of the field magnet will be adjacent one of the faces of the double-faced armature core head.

4. In a device of the character described, a field magnet, an armature coil, a core in the armature coil, one end of the armature core having a single-faced head and the other end having a double-faced head, said single-faced head lying opposite the double-faced head, and means acting through relative movement between the armature core and the field magnet whereby the poles of the permanent magnet are bridged through the armature core first in one direction and then in the opposite direction.

5. In a device of the character described, a field magnet, an armature coil, a core in the armature coil, one end of the armature core having a single-faced head and the other end having a double-faced head, said single-faced head lying opposite the double-faced head, and means acting through relative movement between the armature core and the field magnet whereby the poles of the permanent magnet are bridged through the armature core first in one direction from the single-faced core head to one of the faces of the double-faced core head and then in the reverse direction from the other face of the double-faced core head to the single-faced core head.

6. In a device of the character described, a field magnet, an armature coil, a core in the armature coil, one end of the armature core having a single-faced head and the other end having a double-faced head, said single-faced head lying opposite the double-faced head, and means acting through relative movement between the armature core and the field magnet for bringing the N and S poles of the field magnet successively adjacent the single-faced armature core head, whereby, when the N pole is adjacent such single-faced core head the S pole will be adjacent one of the faces of the double-faced core head and when the S pole is adjacent the single-faced core head the N pole will be adjacent the other face of the double-faced core head.

7. In a device of the character described, a field magnet, an armature coil, a core in the armature coil, one end of the armature core having a single-faced head and the other end having a double-faced head, said single-faced head lying opposite the double-faced head, and means acting through movement of the field magnet for alternately bridging the poles thereof in sequence through the armature core first in one direction from the single-faced armature core head to one of the faces of the double-faced armature core head and then in the reverse direction from the other face of the double-faced armature core head to the single-faced armature core head.

8. In a device of the character described, a stationary armature includng a core and a coil thereon, one end of said armature core having a single-faced head and the other end a double-faced head, the single-faced head lying opposite the double-faced head, and a rotating field magnet adapted to move its poles between said heads and adjacent the faces thereof.

9. In a device of the character described, a stationary armature including a core and a coil thereon, one end of said armature core having a single-faced head and the other end a double-faced head, the single-faced head lying opposite the double-faced head, and a rotating field magnet adapted to move its poles between said heads and adjacent the faces thereof, whereby said poles are bridged through the armature core first in one direction and then in the other.

In testimony whereof I have hereunto set my hand this 13th day of August, 1921.

HENRY G. COX.